US012416979B2

United States Patent
Ninomiya

(10) Patent No.: US 12,416,979 B2
(45) Date of Patent: Sep. 16, 2025

(54) MULTI-DIRECTIONAL INPUT DEVICE

(71) Applicant: Alps Alpine Co., Ltd., Tokyo (JP)

(72) Inventor: Nobuyuki Ninomiya, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/825,379

(22) Filed: Sep. 5, 2024

(65) Prior Publication Data

US 2024/0427429 A1 Dec. 26, 2024

Related U.S. Application Data

(63) Continuation of application No. PCT/JP2023/004408, filed on Feb. 9, 2023.

(30) Foreign Application Priority Data

Mar. 8, 2022 (JP) ................................. 2022-035032

(51) Int. Cl.
*G06F 3/0338* (2013.01)
*H01H 25/04* (2006.01)

(52) U.S. Cl.
CPC ................................. *G06F 3/0338* (2013.01)

(58) Field of Classification Search
CPC ....... G06F 3/0338; H01H 25/04; H01H 25/06
See application file for complete search history.

(56) References Cited

U.S. PATENT DOCUMENTS

| 6,429,767 | B1 | 8/2002 | Shimomura | |
|---|---|---|---|---|
| 10,770,247 | B1* | 9/2020 | Wu | H01H 23/04 |
| 2002/0004423 | A1* | 1/2002 | Minami | A63F 13/24 463/38 |
| 2002/0053968 | A1* | 5/2002 | Ishikawa | H01C 10/32 338/128 |
| 2002/0056621 | A1* | 5/2002 | Nakai | G05G 9/047 200/61.39 |
| 2004/0040826 | A1* | 3/2004 | Kitagawa | H01H 13/48 200/511 |

(Continued)

FOREIGN PATENT DOCUMENTS

| JP | H11-024777 A | 1/1999 |
|---|---|---|
| JP | H11-144568 A | 5/1999 |

(Continued)

*Primary Examiner* — Ibrahim A Khan
(74) *Attorney, Agent, or Firm* — Harness, Dickey & Pierce, P.L.C.

(57) ABSTRACT

A multi-directional input device has: a housing; a tiltable manipulation member that swings around an axis; a linked member, which has a pivotally supported section supported by the housing so as to be swingable around the axis and also has a connecting portion in contact with the manipulation member, the linked member swinging in response to a tilting motion applied to the manipulation member; and a swing detection section that detects the swing of the linked member. The linked member has a flexible portion, located between a connecting portion and the pivotally supported section, that serves as a flexural fulcrum for the flexure of a first portion including the connecting portion with respect to a second portion including the pivotally supported section. The flexure of the first portion due to an external force applied to the connecting portion from the manipulation member is detected by a flexure detection unit.

10 Claims, 13 Drawing Sheets

(56) References Cited

U.S. PATENT DOCUMENTS

| | | | | |
|---|---|---|---|---|
| 2008/0251371 A1* | 10/2008 | Sugahara | ............... | H01H 25/06 |
| | | | | 200/6 A |
| 2012/0267221 A1* | 10/2012 | Gohng | .................. | G06F 3/0338 |
| | | | | 200/61.54 |
| 2013/0161163 A1* | 6/2013 | Nakamura | ............. | H03K 17/98 |
| | | | | 200/16 R |
| 2016/0313759 A1* | 10/2016 | Okamura | ............... | H01H 25/04 |
| 2017/0001106 A1* | 1/2017 | Gassoway | .............. | G05G 9/047 |
| 2018/0174783 A1* | 6/2018 | Wu | ........................ | G05G 9/047 |
| 2018/0190452 A1* | 7/2018 | Wu | ........................ | H01H 25/04 |
| 2021/0247795 A1* | 8/2021 | Asano | ...................... | G05G 5/05 |
| 2021/0250471 A1* | 8/2021 | Kikuchi | ................ | H04N 23/69 |
| 2022/0155812 A1* | 5/2022 | Nakase | ............. | G05G 9/04796 |
| 2023/0032914 A1* | 2/2023 | Asano | .................... | G06F 3/0338 |
| 2023/0121800 A1* | 4/2023 | Hao | ........................ | G05G 5/05 |
| | | | | 200/329 |
| 2024/0177951 A1* | 5/2024 | Furuike | ................ | G06F 3/0338 |

FOREIGN PATENT DOCUMENTS

| | | |
|---|---|---|
| JP | 2000-305647 A | 11/2000 |
| JP | 2002-093286 A | 3/2002 |
| JP | 2009-009799 A | 1/2009 |

\* cited by examiner

MULTI-DIRECTIONAL INPUT DEVICE

CLAIM OF PRIORITY

This application is a Continuation of International Application No. PCT/JP2023/004408 filed on Feb. 9, 2023, which claims benefit of Japanese Patent Application No. 2022-035032 filed on Mar. 8, 2022. The entire contents of each application noted above are hereby incorporated by reference.

BACKGROUND OF THE INVENTION

1. Field of the Invention

The present invention relates to a multi-directional input device that accepts an input made through a manipulation member when it is tilted in a desired direction.

2. Description of the Related Art

Japanese Unexamined Patent Application Publication No. 11-024777 discloses a multi-directional switch that can be thinned and down-sized and needs only a small force to manipulate the multi-directional switch, as a multi-directional input device that accepts an input made through a manipulation member such as a manipulation lever when the manipulation member is tilted. In this multi-directional switch, a curved surface shape is formed so that as the manipulation lever is tilted, the point of a pressure contact between a movable member and the lower end of the manipulation lever moves toward the central axis of the manipulation lever.

Japanese Unexamined Patent Application Publication No. 2000-305647 discloses a multi-directional input device that is superior in manipulation feeling for a manipulation shaft. In this multi-directional input device, the manipulation shaft and an actuating member are spline-coupled together. Therefore, when the manipulation shaft is rotated with it tilted, even if friction is generated between a bottom plate and the bottom of the actuating member due to a pressing force of an urging member, the actuating member, which is splined coupled to the manipulation shaft, is rotated together with the manipulation shaft. The actuating member rotates in such a way that it rolls, without slipping on the bottom plate.

In a multi-directional input device, a linked member, the action of which is triggered by a tilting motion applied to the manipulation member, is provided. The linked member is pivotally supported by a housing, so the linked member swings around a predetermined swing axis with respect to the housing. Part of a detection portion, which detects the swing of the linked member, is attached to the linked member. When the detection portion is, for example, a magnetic detection portion, a magnet is disposed on the same side as the linked member and a magnetic sensor is disposed on the same side as a circuit board. When the linked member swings, a relative position between the magnet and the magnetic sensor changes. Therefore, a change of in magnetic force from the magnet is detected by the magnetic sensor to sense the swing of the linked member. Furthermore, when the manipulation member is pressed (the motion to press the manipulation member is referred to as a push motion), the linked member is displaced. A push sensor is activated due to this displacement to detect the push motion applied to the manipulation member. Since the linked member is involved in detecting both a tilting motion and a push motion applied to the manipulation member, it is necessary to prevent the push motion from affecting the detection of a swing motion.

SUMMARY OF THE INVENTION

In view of the above situation, the present invention provides a multi-directional input device that can prevent a push motion applied to a manipulation member from affecting the detection of a swing motion.

A multi-directional input device in one aspect of the present invention has: a housing; a manipulation member, which is tiltable and swings around a first swing axis; a first linked member, which has a first pivotally supported section supported by the housing so as to be swingable around the first swing axis and also has a connecting portion in contact with the manipulation member, the first linked member swinging in response to a tilting motion applied to the manipulation member; and a first swing detection section that detects the swing of the first linked member. The first linked member has a first portion including the connecting portion, a second portion including the first pivotally supported section, and a flexible portion, located between the first portion and the second portion, that serves as a flexural fulcrum for the flexure of the first portion with respect to the second portion. The flexure of the first portion due to an external force applied to the connecting portion from the manipulation member is detected by a flexure detection unit.

In this specification, the flexural fulcrum refers to a portion, of a member to be flexed, that includes the part at which the largest displacement will occur. Two portions (first portion and second portion) located on both sides of the flexural fulcrum undergo relative displacement substantially without their deformation. In this structure, the displacement of the first portion and the displacement of the second portion can be separated by the flexible portion, so the first pivotally supported section is less likely to be affected by the push motion applied to the manipulation member. This reduces the possibility that the push motion applied to the manipulation member is mistakenly detected as a tilting motion.

In the above multi-directional input device, a portion eligible for detection by the flexure detection unit is preferably located further away from the flexible portion than the connecting portion is. Thus, the amount of displacement of the portion eligible for detection becomes larger than the amount of displacement of the connecting portion, making it easy to increase sensitivity in displacement detection.

The multi-directional input device may further have an urging member that applies, to the manipulation member, a return force with which the manipulation member returns to a neutral position. The urging member may urge the manipulation member to press the first pivotally supported section of the first linked member against the housing, and when the external force is eliminated from the first linked member, may restore the flexed state of the first portion. Due to this type of urging force of the urging member, the manipulation member easily return to the neutral position and the flexed state of the first portion is easily restored.

In the multi-directional input device, the housing preferably includes a holding portion that suppresses displacement of the second portion in a direction other than the direction of a swing around the first swing axis when an external force is applied to the connecting portion. Thus, the displacement of the second portion is suppressed by the holding portion when the first portion is flexed, so the first portion is flexed without the first pivotally supported section being affected.

The above multi-directional input device may further have a second linked member, which has a second pivotally supported section supported by the housing so as to be swingable around a second swing axis crossing the first swing axis, the second linked member swinging in response to a tilting motion applied to the manipulation member, and may also have a second swing detection section that detects the swing of the second linked member. Thus, the manipulation member is tilted around two axes and its tilting is detected.

In the multi-directional input device, the first swing detection section may have a magnetic force generation source disposed in the second portion and may also have a magnetic sensor disposed at a position at which a magnetic force from the magnetic force generation source can be measured. When the magnetic force generation source is disposed in the second portion, the adverse influence of the flexure of the first portion is reduced, enabling the swing of the manipulation member to be stably detected.

In the above multi-directional input device, the bending rigidity of the flexible portion is preferably lower than the bending rigidity of a first continuous portion connected to the flexible portion, the first continuous portion being part of the first portion, and is preferably lower than the bending rigidity of a second continuous portion connected to the flexible portion, the second continuous portion being part of the second portion. Thus, the first portion can be reliably flexed at the flexible portion.

In the above multi-directional input device, the flexible portion, first continuous portion, and second continuous portion may have a portion integrally formed from the same material, and the flexible portion may have a portion thinner than either the first continuous part or the second continuous part. Thus, even when the flexible portion, first continuous portion, and second continuous portion are integrally formed from the same material, the flexible portion can be reliably flexed at the thinner portion.

In the above multi-directional input device, a contact between the first pivotally supported section and the housing may be a rolling contact. In this case, the first swing axis may pass through a contact portion between the first pivotally supported section and the housing. In the above multi-directional input device, a rolling contact may be formed by a convex portion and a concave portion when viewed along the first swing axis. Due to this type of rolling contact, a frictional force at the contact portion becomes smaller than when the first pivotally supported section and housing make a sliding contact.

The present invention can provide a multi-directional input device that can prevent a push motion applied to a manipulation member from affecting the detection of a swing motion.

DESCRIPTION OF THE PREFERRED EMBODIMENTS

Figure 1:
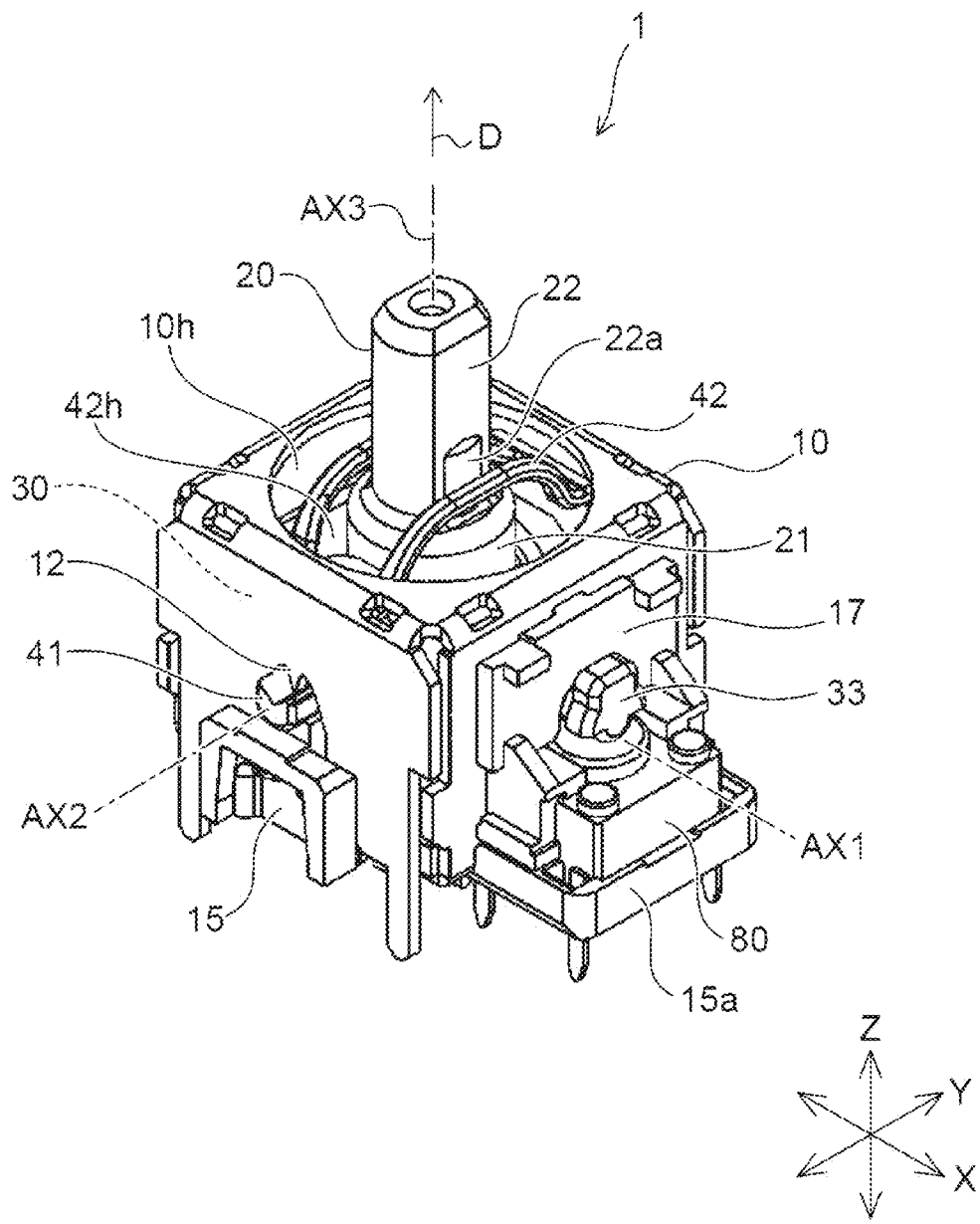
FIG. 1 is a perspective view illustrating a multi-directional input device according to an embodiment.

An embodiment of the present invention will be described below in detail with reference to the accompanying drawings. In the descriptions below, like members will be denoted by like reference characters and repeated descriptions will be appropriately omitted for members that have been described once.

Structure of a Multi-Directional Input Device

Figure 2:
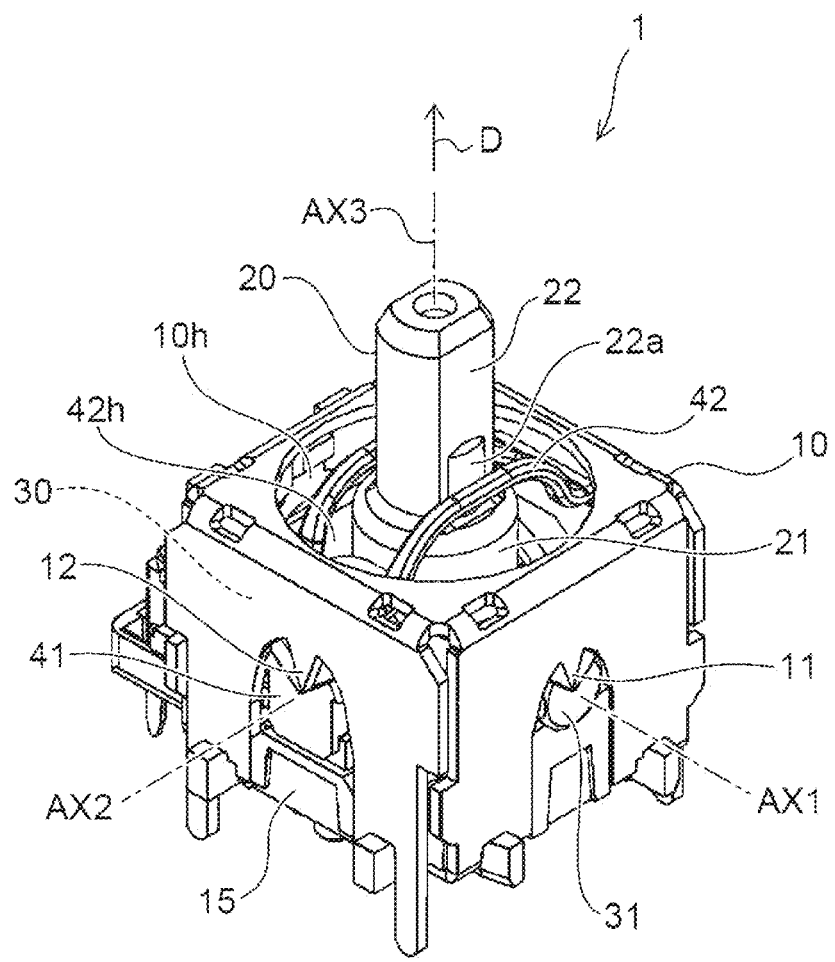
FIG. 2 is also a perspective view illustrating the multi-directional input device according to the embodiment.
Figure 2:
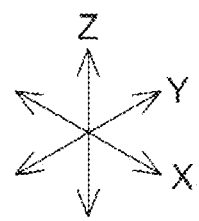

FIGS. 1 and 2 are each a perspective view illustrating a multi-directional input device according to this embodiment.

Figure 3:
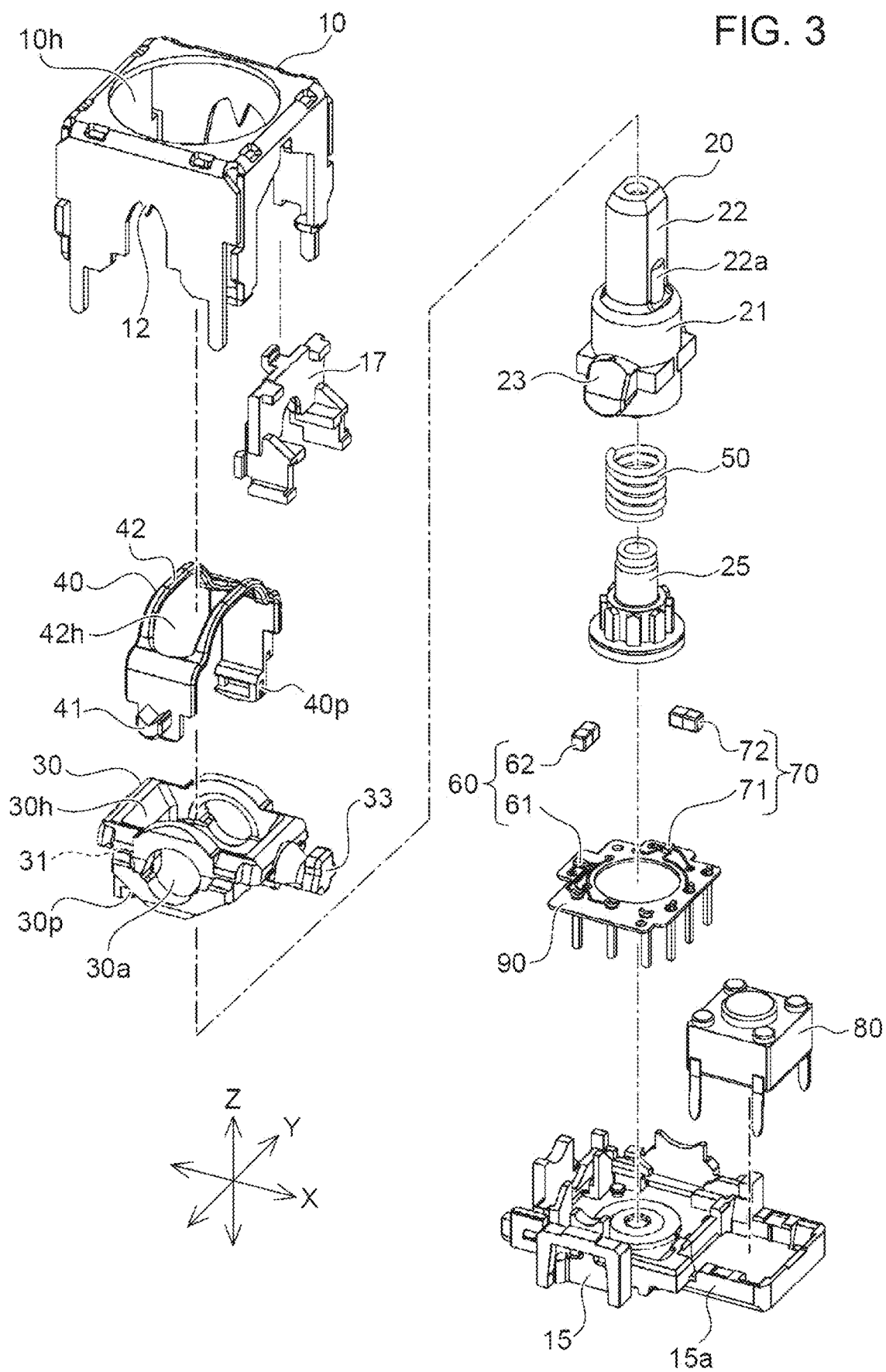
FIG. 3 is an exploded perspective view illustrating the structure of the multi-directional input device according to the embodiment.

FIG. 3 is an exploded perspective view illustrating the structure of the multi-directional input device according to this embodiment.

The multi-directional input device 1 according to this embodiment accepts an input made through a manipulation member 20 when it is tilted with respect to a housing 10.

In the description of the embodiment, it will be assumed that a first swing axis AX1, which is a first of the swing axes involved in the tilting motion applied to the manipulation member 20, is parallel to the X axis, and a second swing axis AX2, which is a second of the swing axes, is parallel to the Y axis, and that the axis (neutral axis AX3) of the manipulation member 20 at a neutral position is parallel to the Z-axis.

The multi-directional input device 1 has the housing 10, the manipulation member 20, a first linked member 30, a second linked member 40, an urging member 50, a first swing detection section 60, a second swing detection section 70, and a displacement detection section 80. The housing 10 is in a substantially box shape with an opening at the bottom. A hole 10h, in which the manipulation member 20 is placed, is formed at the center of the upper portion of the housing 10. A bottom plate member 15 is attached to the opening at the bottom of the housing 10. A frame plate member 17 is attached to a side surface of the housing 10. The bottom plate member 15 may be formed as part of the housing 10. Non-limiting examples of the constituent materials of the housing 10 and bottom plate member 15 include metal materials such as iron-based materials, aluminum-based materials, and copper-based materials. The bottom plate member 15 may be formed from a material different from that of the housing 10 (for example, a resin-based material such as polyester (such as polybutylene terephthalate) or polyamide).

The manipulation member 20 has a cylindrical portion 21 placed in the interior of the housing 10, and also has an extending portion 22 that extends from the interior of the housing 10 through the hole 10h to the outside. When the manipulation member 20 is at the neutral position, an extending direction D, in which the extending portion 22 extends, is parallel to the Z-axis. When the manipulation member 20 is tilted, the extending direction D of the extending portion 22 is non parallel to the Z-axis. The manipulation member 20 can be tilted around the first swing axis AX1 and second swing axis AX2, with respect to the housing 10.

The first linked member 30 has a first pivotally supported section 31, which is supported by the housing 10 so as to be swingable around the first swing axis AX1, the first linked member 30 swinging in response to the tilting motion applied to the manipulation member 20. In the housing 10, a pressure receiving portion 11 is provided that is pressed by the first pivotally supported section 31. The first linked member 30 is in a frame shape having a hole 30h at the center. The manipulation member 20 is inserted into the hole 30h at the center of the first linked member 30. A fitting protrusion 23 protrudes from the cylindrical portion 21 of the manipulation member 20. The fitting protrusion 23 is slidably fitted into a fitting hole 30a formed in the first linked member 30. Non-limiting examples of the constituent material of the first linked member 30 include resin-based materials such as polyacetal, polyester (such as polybutylene terephthalate), and polyamide. Details of the first linked member 30 will be described later.

The second linked member 40 may have a second pivotally supported section 41, which is supported by the housing 10 so as to be swingable around the second swing axis AX2, the second linked member 40 swinging in response to the tilting motion applied to the manipulation member 20. In the housing 10, a pivotally supported contact 12 is provided so as to be in contact with the second pivotally supported section 41. The second linked member 40 has an arch portion 42 curved in an arch shape. A hole 42h is formed at the center of the arch portion 42 of the second linked member 40. The extending portion 22 of the manipulation member 20 is inserted into the hole 42h at the center of the arch portion 42 of the second linked member 40. The extending portion 22 of the manipulation member 20 has a convex portion 22a. When the manipulation member 20 is inserted into the hole 42h in the arch portion 42, the convex portion 22a comes into contact with the arch portion 42, and the extending portion 22 is slidably fitted into the hole 42h.

The second linked member 40 is placed so as to pass over the first linked member 30 in the Y-axis direction. In a state in which the second linked member 40 passes over the first linked member 30 and the extension portion 22 of the manipulation member 20 is inserted into the hole 30h in the first linked member 30 and into the hole 42h in the second linked member 40, the second linked member 40, first linked member 30, and manipulation member 20 are incorporated into the interior of the housing 10.

The urging member 50 may urge the manipulation member 20 to press the first pivotally supported section 31 of the first linked member 30 against the housing 10, and may also apply, to the manipulation member 20, a return force with which the manipulation member 20 returns to the neutral position. The urging member 50 is, for example, a coil spring. The urging member 50 is inserted into the cylindrical portion 21 of the manipulation member 20. There is a bottom cover 25 at the bottom of the cylindrical portion 21, into which the urging member 50 has been inserted. The bottom cover 25 is provided so as to be slidable within the cylindrical portion 21 in an extending direction D, in which the extending portion 22 extends. The bottom cover 25 is in contact with the bottom plate member 15. Thus, the urging member 50 is sandwiched between the bottom cover 25 and an inner upper wall 21a (see FIG. 5) of the cylindrical portion 21. The urging member 50 gives an urging force to the manipulation member 20.

When the manipulation member 20 is tilted, the bottom cover 25 in contact with the bottom plate member 15 receives a reaction force from the bottom plate member 15 and thereby slides along the extending direction D, pressing the urging member 50. When the tilting motion applied to the manipulation member 20 is canceled, the manipulation member 20 returns to the neutral position due to the urging force of the urging member 50.

The first swing detection section 60 detects the swing of the first linked member 30. The second swing detection section 70 may detect the swing of the second linked member 40. The first swing detection section 60 may have, for example, a magnetic sensor 61 and a permanent magnet (magnet 62), which is a magnetic force generation source. The second swing detection section 70 has, for example, a magnetic sensor 71 and a permanent magnet (magnet 72). The magnetic sensors 61 and 71 are mounted on a circuit board 90. The circuit board 90, on which the magnetic sensors 61 and 71 are mounted, is placed on the bottom plate member 15.

The magnet 62, which faces the magnetic sensor 61, is placed in a pocket 30p formed in the first linked member 30. The magnet 72, which faces the magnetic sensor 71, is placed in a pocket 40p formed in the second linked member 40. The magnet 62 swings around the first swing axis AX1 when the first linked member 30 swings. The magnet 72 swings around the second swing axis AX2 when the second linked member 40 swings. Due to the swings of the magnets 62 and 72, their positions relative to the magnetic sensors 61 and 71 fixed to the circuit board 90 change. The resulting changes in magnetic field strength are detected by the magnetic sensors 61 and 71. The swings of the first linked member 30 and the second linked member 40 are detected by signals output from the magnetic sensors 61 and 71.

The bottom plate member 15 has a component mounting portion 15a, which extends laterally. The displacement detection section 80 is attached to the component attachment section 15a. The displacement detection section 80 is, for example, a switch of contact detection type such as a Tact switch (registered trademark). The displacement detection unit 80 detects displacement of the manipulation member 20 in a direction different from both a direction around the first swing axis AX1 and a direction around the second swing axis AX2. In this embodiment, the displacement detection section 80 detects displacement along the direction in which the manipulation member 20 extends.

The first linked member 30 has an arm 33, which extends above the displacement detection portion 80, from a side opposite to the side on which the first pivotally supported section 31 is disposed. For example, when the manipulation member 20 is pushed in a direction opposite to the direction in which the manipulation member 20 extends from the housing 10 (this pressing motion is also referred to as a push motion), a fulcrum is located on the same side as the first pivotally supported section 31, and the arm 33 of the first linked member 30 is pressed toward the displacement detection portion 80 due to the pressing force. Thus, the arm 33 comes into contact with the displacement detection section 80, activating the displacement detection section 80. The push motion will be described later in detail.

Tilting Motion Applied to the Manipulation Member

Figure 4:
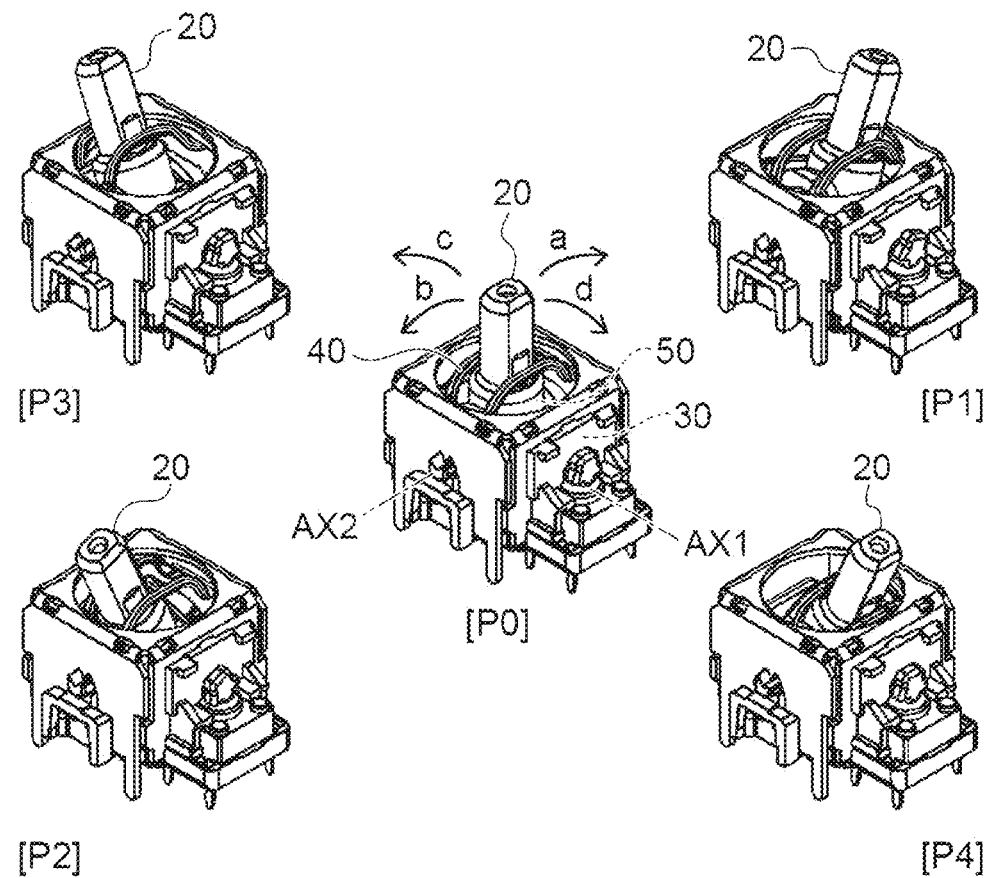
FIG. 4 is a perspective view illustrating a tilting motion applied to a manipulation member.
Figure 4:
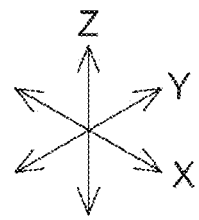

FIG. 4 is a perspective view illustrating a tilting motion applied to the manipulation member 20.

[P0] in FIG. 4 illustrates a state in which the manipulation member 20 is at the neutral position. That is, when no manipulation force is applied to the manipulation member 20, in which case there is no load, the manipulation member 20 is at the neutral position as illustrated at [P0]. In this embodiment, when the manipulation member 20 is at the neutral position, the extending portion 22 of the manipulation member 20 extends along a direction intersecting both the first swing axis AX1 and the second swing axis AX2, specifically the Z-axis direction.

When a manipulation force is applied to the manipulation member 20 in the direction of arrow a with the manipulation member 20 at the neutral position, the first linked member 30 swings around the first swing axis AX1 and the manipulation member 20 tilts as illustrated at [P1] in FIG. 4. When the manipulation force applied to the manipulation member 20 is eliminated in the state at [P1], the manipulation member 20 returns to the neutral position at [P0] due to the urging force of the urging member 50. Conversely, when a manipulation force is applied to the manipulation member 20 in the direction of arrow b with the manipulation member 20 at the neutral position, the first linked member 30 swings around the first swing axis AX1 in a direction opposite to the direction at [P1] and the manipulation member 20 tilts as illustrated at [P2] in FIG. 4. When the manipulation force applied to the manipulation member 20 is eliminated in the state at [P2], the manipulation member 20 returns to the neutral position at [P0] due to the urging force of the urging member 50.

When a manipulation force is applied to the manipulation member 20 in the direction of arrow c with the manipulation member 20 at the neutral position, the second linked member 40 swings around the second swing axis AX2, and the manipulation member 20 swings as illustrated at [P3] in FIG. 4. When the manipulation force applied to the manipulation member 20 is eliminated in the state at [P3], the manipulation member 20 returns to the neutral position at [P0] due to the urging force of the urging member 50. Conversely, when a manipulation force is applied to the manipulation member 20 in the direction of the arrow d with the manipulation member 20 at the neutral position, the second linked member 40 swings around the second swing axis AX2 in a direction opposite to the direction at [P3] and the manipulation member 20 tilts as illustrated at [P4] in FIG. 4. When the manipulation force applied to the manipulation member 20 is eliminated in the state at [P4], the manipulation member 20 returns to the neutral position at [P0] due to the urging force of the urging member 50.

When a manipulation force is applied to the manipulation member 20 in a direction other than the directions of arrows a, b, c, and d with the manipulation member 20 at the neutral position, the first linked member 30 and the second linked member 40 swing according to components in the directions of arrows a, b, c, and d in the direction in which the manipulation force is applied and the manipulation member 20 tilts to a position other than at [P1], [P2], [P3], and [P4]. That is, the manipulation member 20 can tilt in a direction at any angle within 360 degrees when viewed along the Z-axis.

First Linked Member

Figure 5:
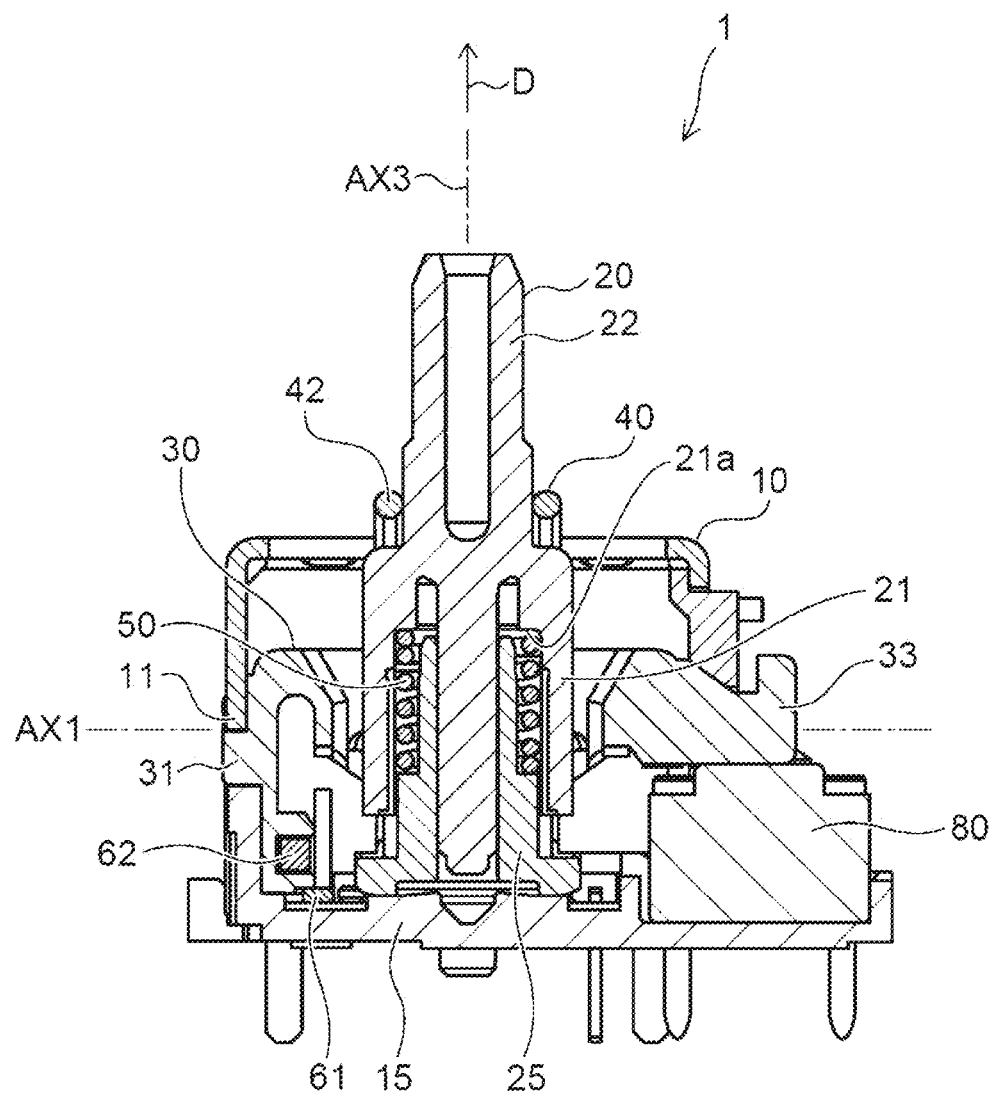
FIG. 5 is a sectional view of the multi-directional input device according to the embodiment.
Figure 5:
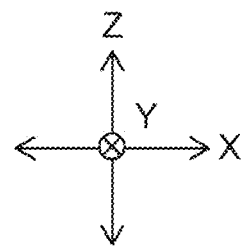

FIG. 5 is a sectional view of the multi-directional input device 1 according to this embodiment.

The sectional view in FIG. 5 is taken along a plane that includes the first swing axis AX1 and is orthogonal to the Y-axis.

Figure 6:
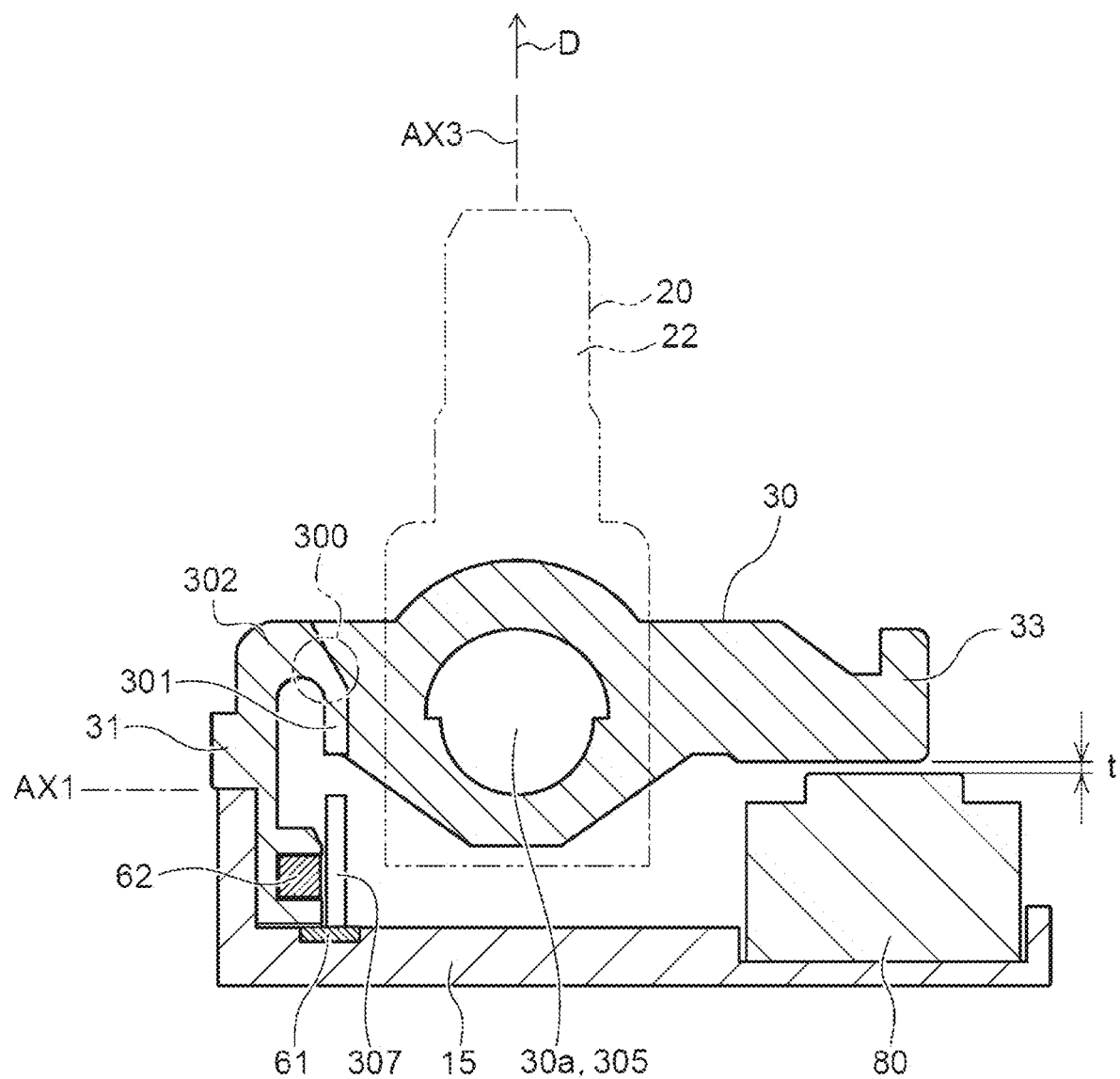
FIG. 6 is a schematic view to explain the action of a first linked member.
Figure 6:
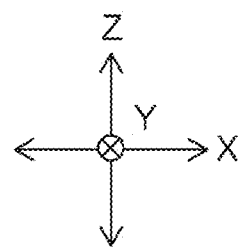
Figure 7:
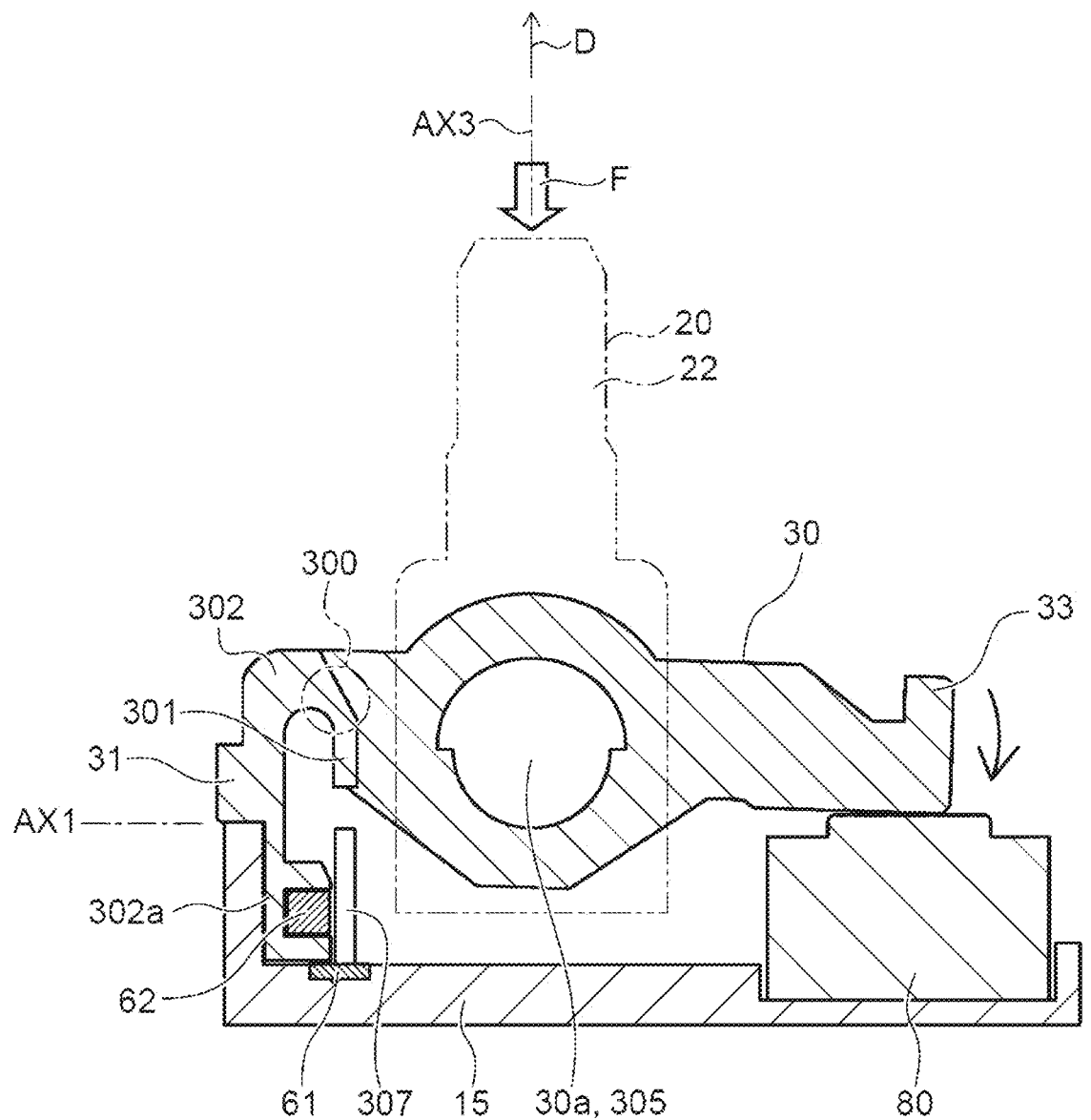
FIG. 7 is also a schematic view to explain the action of the first linked member.
Figure 7:
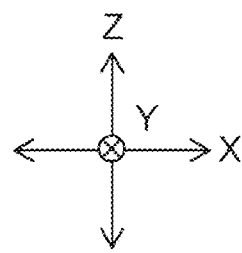

FIGS. 6 and 7 are schematic views to explain the motion applied to the first linked member 30.

At the first pivotally supported section 31, the first linked member 30 is pivotally supported by the housing 10. The structure in this pivotal support is not limited. In this embodiment, as an example, the contact between the first pivotally supported section 31 and the housing 10 may be a rolling contact, and the first swing axis AX1 may pass through the contact portion between the first pivotally supported section 31 and the housing 10. In a specific example of this structure, a rolling contact may be formed at the contact portion between the first pivotally supported section 31 and the housing 10 by a convex portion and a concave portion when viewed along the first swing axis AX1.

In this embodiment, the housing 10 has a pressure receiving portion 11, which is pressed by the first pivotally supported section 31. The pressure receiving portion 11 is, for example, a V-shaped protrusion. The first pivotally supported section 31 has a V-shaped recess for receiving the V-shaped protrusion of the pressure receiving portion 11. When viewed along the first swing axis AX1, the recessed portion in the first pivotally supported section 31 includes a V-shape wider than the angle of the V-shaped protrusion of the pressure receiving portion 11. When the V-shaped protrusion of the pressure-receiving portion 11 and the V-shaped valley of the recess in the first pivotally supported section 31 come into contact with each other, a rolling contact is made around the first swing axis AX1. Due to this type of rolling contact, a frictional force at the contact portion becomes smaller than when the first pivotally supported section 31 and housing 10 make a sliding contact.

The first pivotally supported section 31 is provided only on one side of the first linked member 30 on the first swing axis AX1. The arm 33 is disposed on a side opposite to the first pivotally supported section 31 of the first linked member 30 on the first swing axis AX1.

When the fitting protrusion 23 fits into the fitting hole 30a formed in the first linked member 30, the manipulation member 20 is linked to the first linked member 30. The fitting hole 30a, into which the fitting protrusion 23 is fitted, is included in a connecting portion 305 in the first linked member 30. On the first swing axis AX1, therefore, the first linked member 30 is supported at the position on the fitting protrusion 23 of the manipulation member 20 and at the position on the first pivotally supported section 31 on one side with respect to the position of the manipulation member 20.

In this embodiment, the first linked member 30 has a first portion 301, a second portion 302, and a flexible portion 300. The first portion 301 includes the connecting portion 305, and the second portion 302 includes the first pivotally supported section 31. The flexible portion 300 is located between the first portion 301 and the second portion 302, and serves as a flexural fulcrum for the flexure of the first portion 301 with respect to the second portion 302.

As illustrated in FIG. 6, while the manipulation member 20 undergoes no push motion, an urging force is applied from the urging member 50 to the manipulation member 20, urging the first linked member 30 in the extending direction D of the extending portion 22. In this state, therefore, the first portion 301 of the first linked member 30 is not flexed, so the first portion 301 and second portion 302 are not substantially displaced relative to each other. Since the first portion 301 is not flexed, a gap t between the displacement detection section 80 and the arm 33 of the first linked member 30 is maintained, preventing the displacement detection section 80 from being activated.

As illustrated in FIG. 7, when a push motion is applied to the manipulation member 20, an external force F is applied to the manipulation member 20 in a direction opposite to the extending direction D. Since the manipulation member 20 is connected to the first linked member 30 through the connecting portion 305, the external force F is transmitted to the first linked member 30 through the connecting portion 305. When the external force F is transmitted to the connecting portion 305, the first portion 301 of the first linked member 30 is flexed with respect to the second portion 302 with the flexible portion 300 serving as a flexural fulcrum. Due to this flexure, the first portion 301, which includes the connecting portion 305, and the second portion 302 are displaced relative to each other. Specifically, the first portion 301 is displaced in the direction opposite to the extending direction D.

The arm 33 of the first linked member 30 may be located further away from the flexible portion 300 than the connecting portion 305 is. Therefore, a relationship is established in which the flexible portion 300 serves as a fulcrum, the connecting portion 305 serves as a point of effort, and the arm 33 serves as a point of action. Therefore, the amount of displacement of the arm 33 in the direction opposite to the extending direction D is larger than the amount of displacement of the connecting portion 305, so the arm 33 comes into contact with the displacement detection portion 80 and activates it. In FIG. 7, this displacement of the arm 33 is indicated by the clockwise arrow. In this way, the displacement detection section 80 functions as a flexure detection unit that detects the flexure, of the first portion 301, which is caused by the external force F generated by a push motion. Thus, the push motion is detected.

When the first linked member 30 receives the external force F from the manipulation member 20 due to a push motion, the first portion 301 is flexed with the flexible portion 300 serving as a flexural fulcrum. Even upon the receipt of the external force F by the first linked member 30, therefore, the second portion 302 is less likely to be affected by the displacement of the first portion 301 including the connecting portion 305. That is, since the flexible portion 300 is disposed, the displacement of the first portion 301 and the displacement of the second portion 302 can be separated. Therefore, the first pivotally supported section 31 included in the second portion 302 is less likely to be affected by the push motion applied to the manipulation member 20.

When the first linked member 30 receives an external force F', which causes the first linked member 30 to undergo displacement (to swing) around the first swing axis AX1, from the manipulation member 20, the first pivotally supported section 31 undergoes displacement (swings) around the first swing axis AX1 according to the external force F'. In this way, the first linked member 30 can act differently depending on the direction of the external force that the first linked member 30 receives from the manipulation member 20. Thereby, the multi-directional input device 1 according to this embodiment can appropriately identify the external force F and the external force F'.

The magnet 62 facing the magnetic sensor 61 is placed in the second portion 302. Even when a push motion is applied to the manipulation member 20, the second portion 302 is not easily affected by the push motion. Therefore, a change in the relative position between the magnet 62 and the magnetic sensor 61 is suppressed when the push motion is performed. This reduces the possibility that the push motion applied to the manipulation member 20 is mistakenly detected as a tilting motion.

When a push motion is applied to the manipulation member 20 and an external force F is thereby applied to the connecting portion 305 of the first linked member 30, the second portion 302 may be displaced in a direction other than the direction of a swing around the first swing axis AX1. Therefore, it is preferable to provide a holding portion 307 to suppress this displacement. The holding portion 307 is disposed, for example, in the housing 10 or on the bottom plate member 15. The holding portion 307 is placed so as to face a portion 302a, which is part of the second portion 302, on a side opposite to the first portion 301 with respect to the first swing axis AX1.

This portion 302a is easily affected by the displacement (displacement due to flexure or return) of the first portion 301 when the external force F is applied or eliminated. However, with the holding portion 307 placed so as to face this portion 302a, when the external force F is applied to the connecting portion 305 of the first linked member 30 and the first portion 301 is thereby displaced, the displacement of the second portion 302 can be suppressed. Specifically, it is possible to restrain the second portion 302 from being displaced clockwise together with the first portion 301. This reduces the possibility that the first pivotally supported section 31 is similarly displaced and the first swing axis AX1 is offset.

During the use of the multi-directional input device 1, an external force F with which a push motion is applied and an external force F' with which a swing around the first swing axis AX1 occurs may be applied simultaneously. Even in this case, the offset of the first swing axis AX1 due to the external force F is appropriately suppressed. Therefore, the multi-directional input device 1 can detect the displacement due to the external force F and can appropriately control the swing due to the external force F'.

In the structure as described above, in which the first portion 301 of the first linked member 30 is flexed relative to the second portion 302 with the flexible portion 300 serving as a flexural fulcrum, the bending rigidity of the flexible portion 300 is preferably lower than the bending rigidity of a first continuous portion connected to the flexible portion 300, the first continuous portion being part of the first portion 301, and also lower than the bending rigidity of a second continuous portion connected to the flexible portion 300, the second continuous portion being part of the second portion 302. Thus, when the first portion 301 is flexed, the flexible portion 300 can be reliably flexed and deformed and the deformation of other portions can be suppressed. Therefore, the adverse influence particularly on the detection of the swing of the second portion 302 can be further reduced.

When the flexible portion 300, first continuous part, and second continuous part are integrally formed from the same material, it suffices for the flexible portion 300 to have a portion thinner than either the first continuous part or the second continuous part. Thus, even when the flexible portion 300, first continuous portion, and second continuous portion are integrally formed from the same material, the bending rigidity of the thin portion of the flexible portion 300 can be made lower than the bending rigidity of the first continuous portion and the bending rigidity of second continuous portion, so flexure at the flexible portion 300 becomes possible.

As described above, in this embodiment, to make the flexure of the first portion 301 more likely to be detected, the arm 33, which is a portion eligible for detection by the displacement detection section 80, may be located further away from the flexible portion 300 than the connecting portion 305 is. Thus, the amount of displacement of the arm 33 becomes larger than the amount of displacement of the connecting portion 305, making it easy to increase sensitivity in displacement detection. For example, even if the push stroke of a push motion is short, the displacement detection section 80 can be reliably activated.

Push Motion Applied to the Manipulation Member

FIGS. 8A to 10B are each a sectional view to explain a push motion applied to the manipulation member 20.

Each sectional view in FIGS. 8A to 10B is taken along a plane that includes the first swing axis AX1 and is orthogonal to the Y-axis.

Figure 8A:
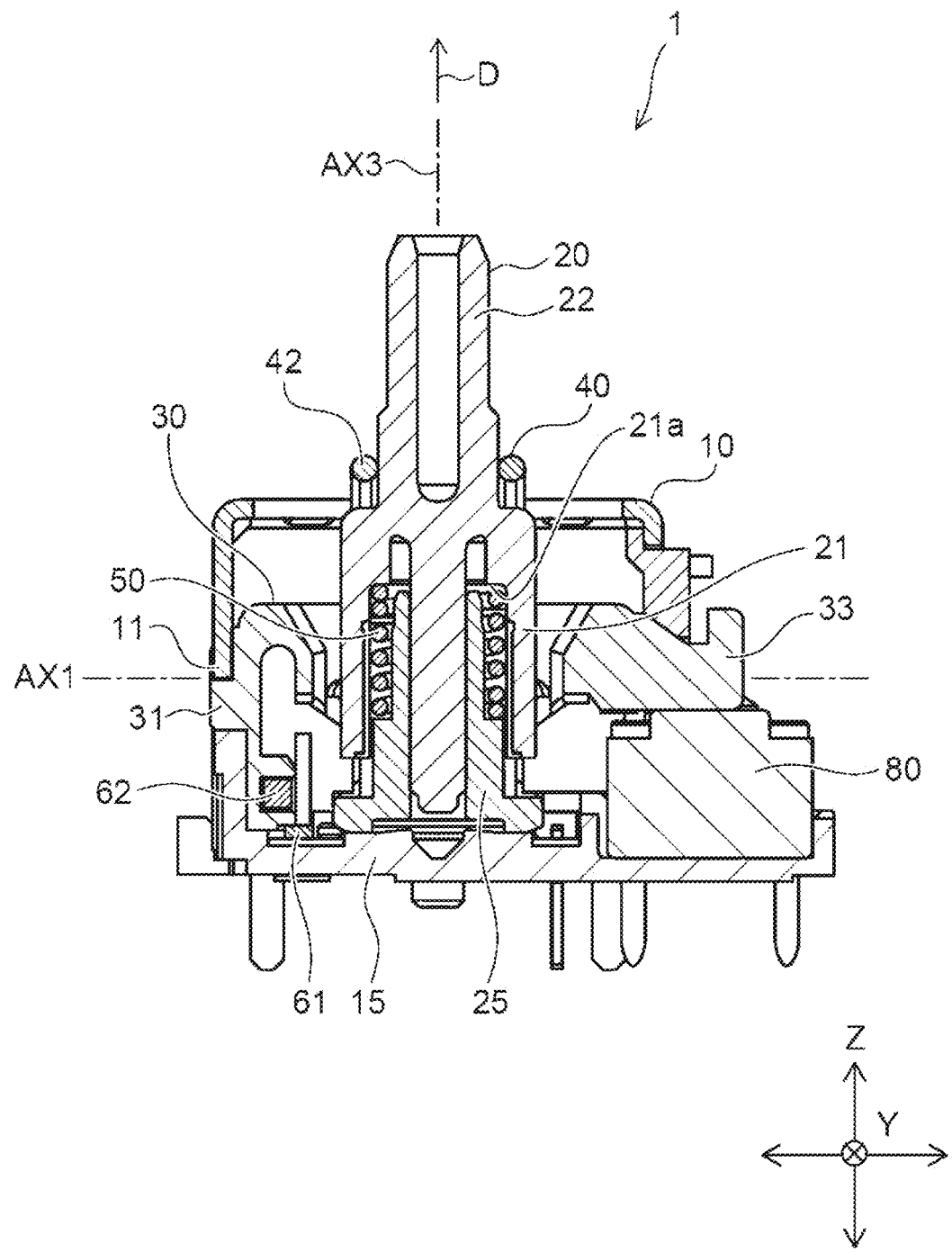
FIG. 8A is a sectional view to explain a push motion applied to the manipulation member.
Figure 8B:
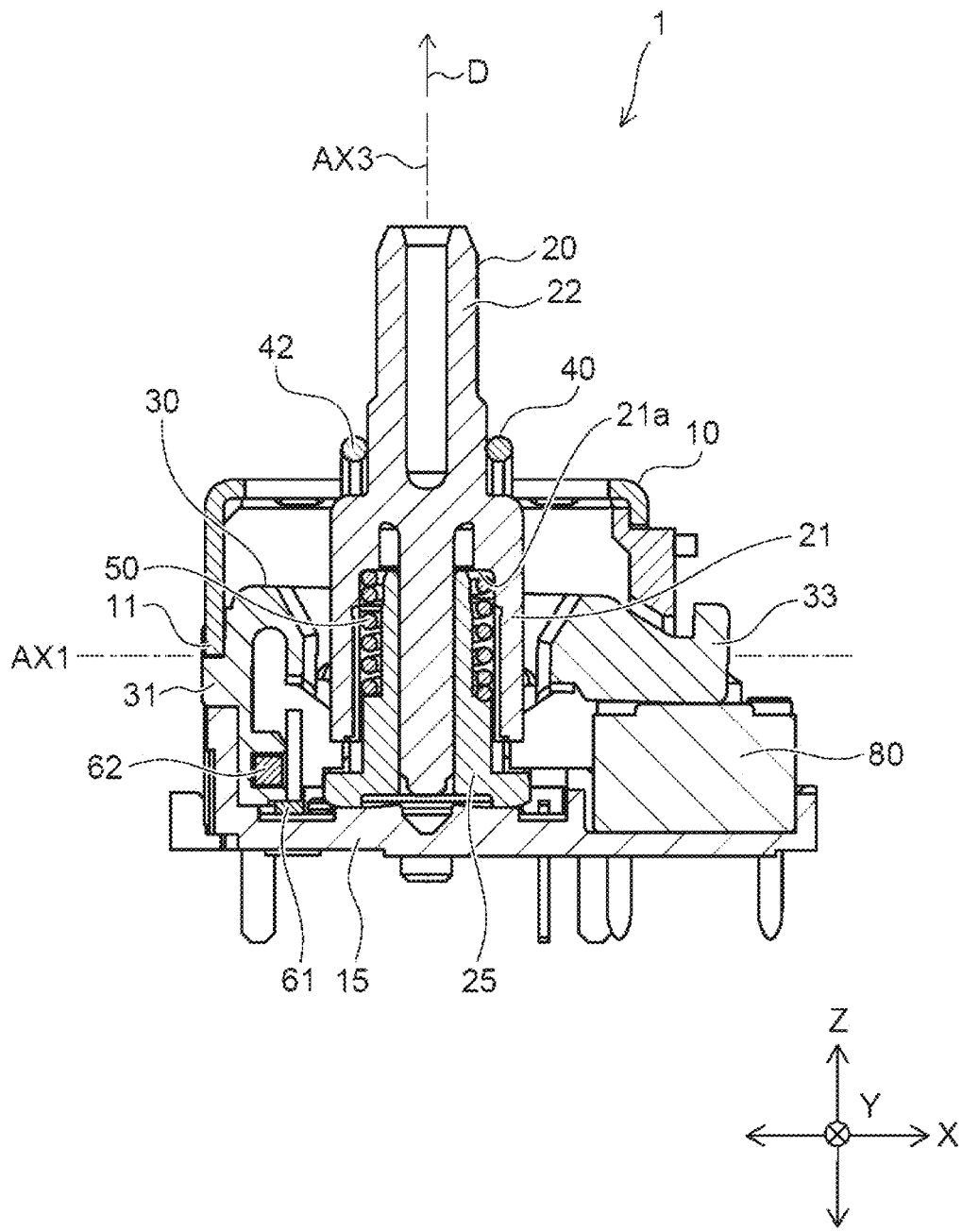
FIG. 8B is also a sectional view to explain a push manipulation by the manipulation member.

FIG. 8A illustrates a state in which the manipulation member 20 is at the neutral position, and FIG. 8B illustrates a state in which a push motion is applied to the manipulation member 20 at the neutral position.

As illustrated in FIG. 8A, before the manipulation member 20 at the neutral position undergoes a push motion, an urging force is applied from the urging member 50 to the manipulation member 20, urging the first linked member 30 in the extending direction D of the extending portion 22. In this state, although the arm 33 of the first linked member 30 is in contact with the displacement detection section 80, the contact is not enough to activate the displacement detection section 80.

As illustrated in FIG. 8B, when a push motion is applied to the manipulation member 20, the manipulation member 20 is pushed against the urging force from the urging member 50. Thus, the same side as the arm 33 of the first linked member 30 that is fitted to the manipulation member 20 is flexed with the flexible portion 300 of the first linked member 30 serving as a flexural fulcrum, and is pressed toward the displacement detection section 80.

The first linked member 30, fitted to the manipulation member 20, is supported at the position of the first pivotally supported section 31 on the first swing axis AX1. Therefore, the fitting position between the manipulation member 20 and the first linked member 30 (specifically, the fitting position between the fitting hole 30a and the fitting protrusion 23 illustrated in FIG. 3) is closer to the first pivotally supported section 31 than to the arm 33 in the direction along the first swing axis AX1. Thus, when a pressing force due to the push motion applied to the manipulation member 20 is applied to the first linked member 30, a fulcrum (flexural fulcrum) is located on the same side as the flexible portion 300 of the first pivotally supported section 31, the fitting position between the manipulation member 20 and the first linked member 30 serves as a point of effort, and the tip of the arm part 33 serves as a point of load. Therefore, the amount of displacement caused by the push motion applied to the manipulation member 20 is magnified at the arm 33, and the arm 33 reliably has a contact with the displacement detection section 80 located below the arm 33, activating the displacement detection section 80.

Figure 9A:
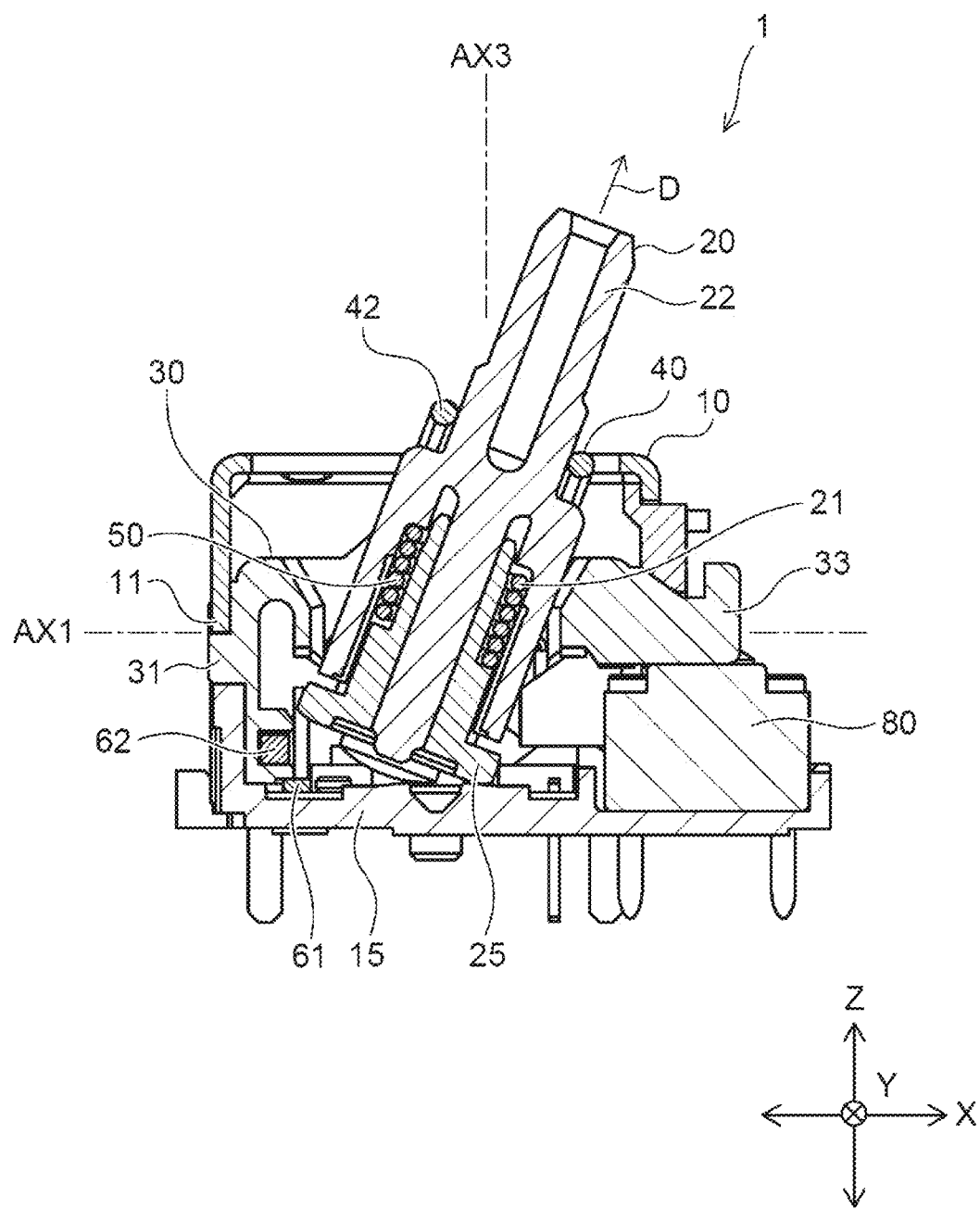
FIG. 9A is also a sectional view to explain a push motion applied to the manipulation member.
Figure 9B:
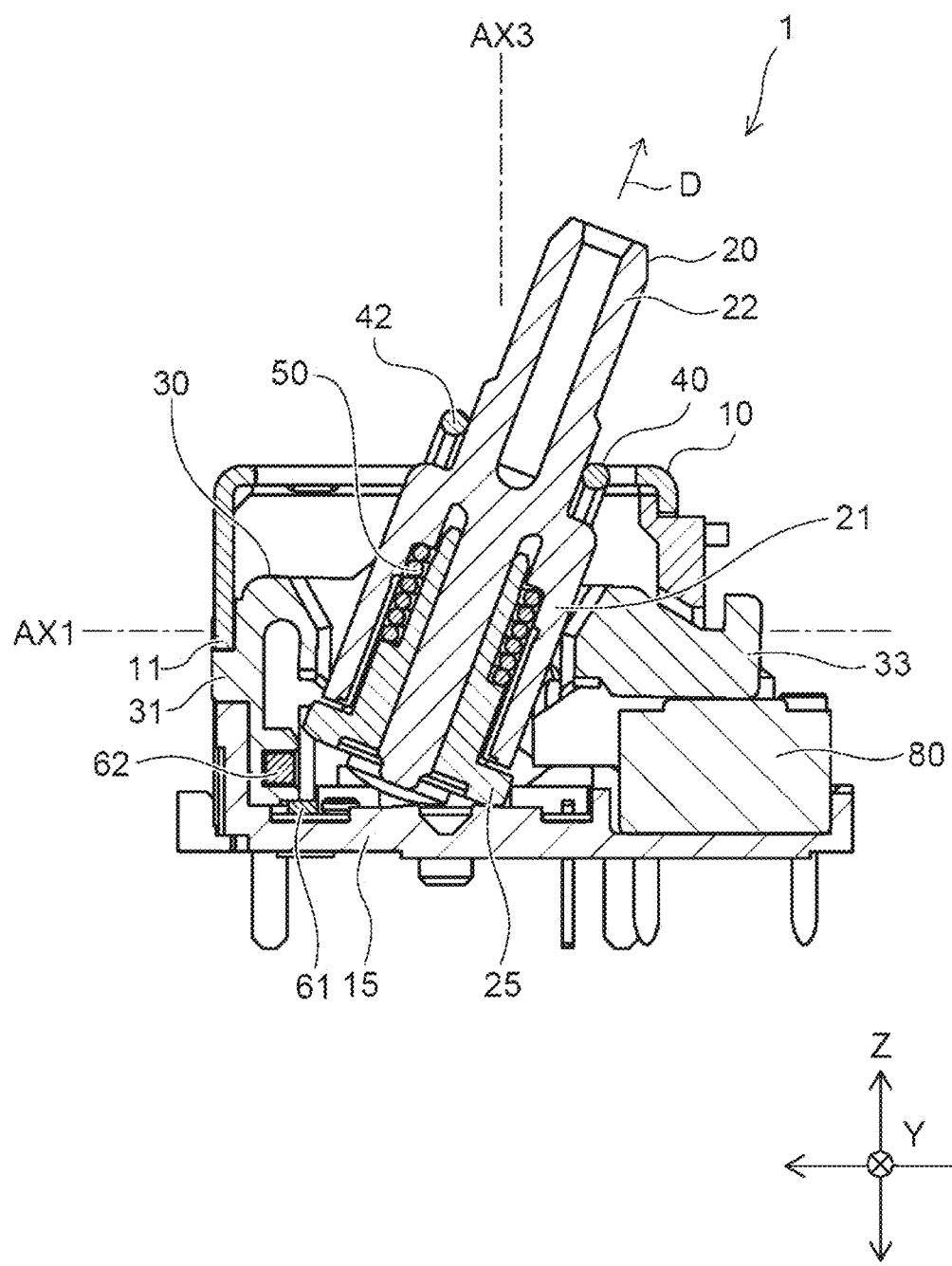
FIG. 9B is also a sectional view to explain a push motion applied to the manipulation member.

FIG. 9A illustrates a state in which the manipulation member 20 is tilted around the second swing axis AX2, and FIG. 9B illustrates a state in which a push motion is applied to the manipulation member 20 at a tilted position.

As illustrated in FIG. 9A, when the manipulation member 20 is tilted around the second swing axis AX2, the bottom cover 25 is also tilted together with the manipulation member 20. Thus, the bottom cover 25 receives a reaction force from the bottom plate member 15 and is pressed in the extending direction D, acting to contract the urging member 50 in the cylindrical portion 21. In this state, although the arm 33 of the first linked member 30 is in contact with the displacement detection section 80, the contact is not enough to activate the displacement detection section 80 because the urging force of the urging member 50 is applied to the first linked member 30.

As illustrated in FIG. 9B, when a push motion is applied to the manipulation member 20 in the tilted state, the manipulation member 20 is pushed against the urging force from the urging member 50. Thus, the same side as the arm 33 of the first linked member 30 fitted to the manipulation member 20 is flexed with the flexible portion 300 of the first linked member 30 serving as a flexural fulcrum, and is pressed toward the displacement detection section 80. As a result, the arm 33 in contact with the displacement detection section 80 activates the displacement detection section 80.

Figure 10A:
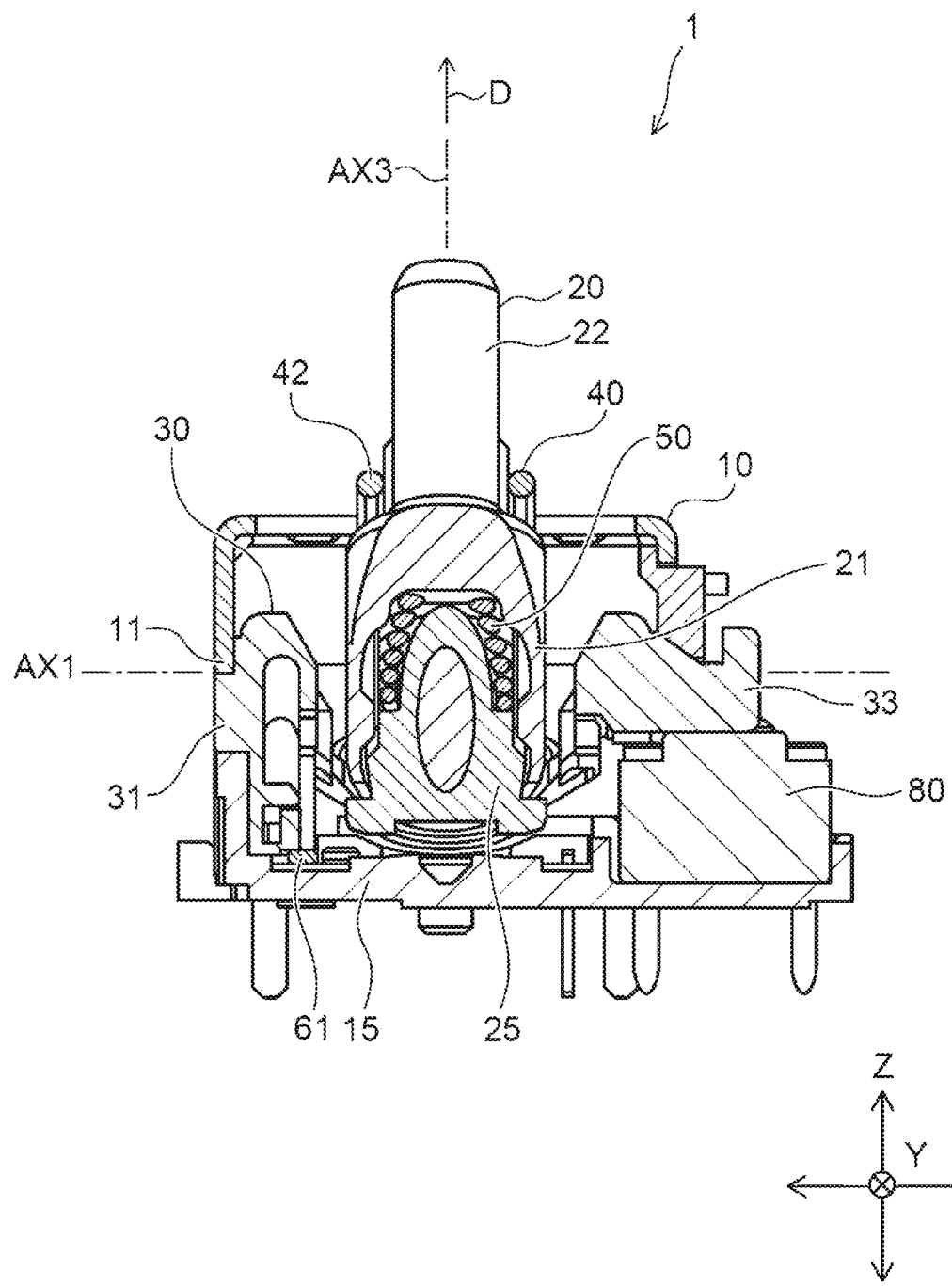
FIG. 10A is also a sectional view to explain a push motion applied to the manipulation member.
Figure 10B:
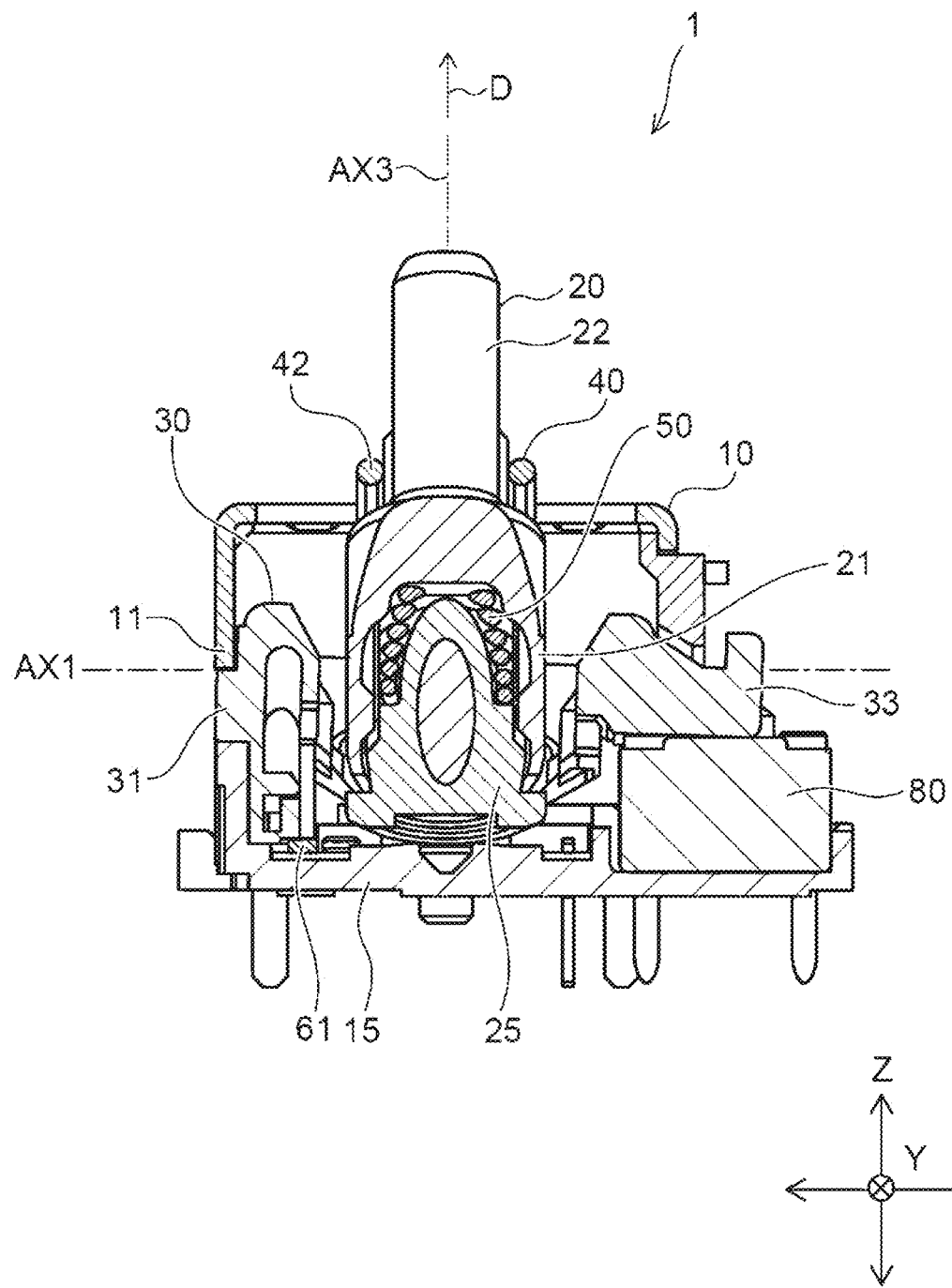
FIG. 10B is also a sectional view to explain a push motion applied to the manipulation member.

FIG. 10A illustrates a state in which the manipulation member 20 is tilted around the first swing axis AX1, and FIG. 10B illustrates a state in which a push motion is applied to the manipulation member 20 at a tilted position.

As illustrated in FIG. 10A, when the manipulation member 20 is tilted around the first swing axis AX1, the first linked member 30 also swings together with the manipulation member 20. Along with the tilt of the manipulation member 20, the bottom cover 25 also tilts. Thus, the bottom cover 25 receives a reaction force from the bottom plate member 15 and is pressed in the extending direction D, acting to contract the urging member 50 in the cylindrical portion 21. Although the first linked member 30 swings and the arm 33 of the first linked member 30 is in contact with the displacement detection section 80, the contact is not enough to activate the displacement detection section 80 because the urging force of the urging member 50 is applied to the first linked member 30.

As illustrated in FIG. 10B, when a push motion is applied to the manipulation member 20 in the tilted state, the manipulation member 20 is pushed against the urging force from the urging member 50. Thus, the same side as the arm 33 of the first linked member 30 fitted to the manipulation member 20 is flexed with the flexible portion 300 of the first linked member 30 serving as a flexural fulcrum, and is pressed toward the displacement detection section 80. As a result, the arm 33 in contact with the displacement detection section 80 activates the displacement detection section 80.

As described above, the multi-directional input device 1 according to this embodiment can prevent a push motion applied to the manipulation member 20 from affecting the detection of a swing motion.

This completes the description of the embodiment of the present invention. However, the present invention is not limited to examples in the embodiment. For example, the multi-directional input device 1 may have a structure that lacks the second linked member 40 and second swing detection section 70. The scope of the present invention also includes embodiments obtained as a result of appropriately adding or deleting constituent elements to or from the above embodiment, performing design changes to the above embodiment, or appropriately combining features in the examples of the structure in the above embodiment without departing from the intended scope of the present invention; the addition, deletion, design change, or combination is effected by a person having ordinary skill in the art.

What is claimed is:

1. A multi-directional input device comprising:
a housing;
a manipulation member, which is tiltable and swings around a first swing axis;
a first linked member, which has a first pivotally supported section supported by the housing so as to be swingable around the first swing axis and also has a connecting portion in contact with the manipulation member, the first linked member swinging in response to a tilting motion applied to the manipulation member;

a first swing detection section that detects a swing of the first linked member; and a flexure detection unit; wherein the first linked member has a first portion including the connecting portion, a second portion including the first pivotally supported section, and a flexible portion, located between the first portion and the second portion, that serves as a flexural fulcrum for a flexure of the first portion with respect to the second portion, and the flexure of the first portion due to an external force applied to the connecting portion from the manipulation member is detected by the flexure detection unit.

2. The multi-directional input device according to claim 1, wherein a portion eligible for detection by the flexure detection unit is located further away from the flexible portion than the connecting portion is.

3. The multi-directional input device according to claim 1, further comprising an urging member that applies, to the manipulation member, a return force with which the manipulation member returns to a neutral position, wherein the urging member urges the manipulation member to press the first pivotally supported section of the first linked member against the housing, and when the external force is eliminated from the first linked member, restores the flexed state of the first portion.

4. The multi-directional input device according to claim 1, wherein the housing includes a holding portion that suppresses displacement of the second portion in a direction other than a direction of a swing around the first swing axis when the external force is applied to the connecting portion.

5. The multi-directional input device according to claim 1, further comprising:

a second linked member, which has a second pivotally supported section supported by the housing so as to be swingable around a second swing axis crossing the first swing axis, the second linked member swinging in response to a tilting motion applied to the manipulation member; and a second swing detection section that detects a swing of the second linked member.

6. The multi-directional input device according to claim 1, wherein the first swing detection section has a magnetic force generation source disposed in the second portion and also has a magnetic sensor disposed at a position at which a magnetic force from the magnetic force generation source is measurable.

7. The multi-directional input device according to claim 1, wherein bending rigidity of the flexible portion is lower than bending rigidity of a first continuous portion connected to the flexible portion, the first continuous portion being part of the first portion, and is lower than bending rigidity of a second continuous portion connected to the flexible portion, the second continuous portion being part of the second portion.

8. The multi-directional input device according to claim 7, wherein the flexible portion, the first continuous portion, and the second continuous portion have a portion integrally formed from the same material, and the flexible portion has a portion thinner than either the first continuous part or the second continuous part.

9. The multi-directional input device according to claim 1, wherein a contact between the first pivotally supported section and the housing is a rolling contact, and the first swing axis passes through a contact portion between the first pivotally supported section and the housing.

10. The multi-directional input device according to claim 9, wherein the rolling contact is formed by a convex portion and a concave portion when viewed along the first swing axis.

* * * * *